United States Patent [19]

Schuplin

[11] 3,802,655

[45] Apr. 9, 1974

[54] PIPE HANGERS

[75] Inventor: Jerome T. Schuplin, Parma Heights, Ohio

[73] Assignee: Fastway Fasteners, Inc., Lorain, Ohio

[22] Filed: Apr. 13, 1972

[21] Appl. No.: 243,631

[52] U.S. Cl................ 248/74 R, 248/54 R, 248/62, 248/74 PB
[51] Int. Cl............................................. F16l 3/02
[58] Field of Search............ 248/71, 62, 74 A, 74 B, 248/74 PB, 74 R, 73, 15, 9, 49, 54 R, 58

[56] References Cited
UNITED STATES PATENTS

| | | | |
|---|---|---|---|
| 3,266,761 | 8/1966 | Walton et al. | 248/71 |
| 3,243,151 | 3/1966 | Varney et al. | 248/74 |
| 3,128,073 | 4/1964 | Berlyn | 248/62 X |
| 3,170,736 | 2/1965 | Wright | 248/54 R X |
| 2,279,866 | 4/1942 | Ellinwood | 248/71 X |
| 3,188,030 | 6/1965 | Fischer | 248/68 CB |
| 3,430,904 | 3/1969 | Soltysik | 248/73 X |

FOREIGN PATENTS OR APPLICATIONS 679,404  9/1952  Great Britain........................ 248/9

Primary Examiner—Roy D. Frazier
Assistant Examiner—Rodney H. Bonck
Attorney, Agent, or Firm—Isler and Ornstein

[57] ABSTRACT

A pipe hanger is disclosed comprising a body in the form of a split ring, and having attaching cars extending tangentially therefrom in opposite directions. The split is along a plane tangential to one side of the bore of the ring, with the surfaces defining the split spaced from each other to provide a gap therebetween, even when the hanger is secured to a joist or the like, so that tension is always exerted on the pipe. Means are also provided in the hanger for creating additional frictional pressure on the outer wall of the pipe for preventing vibration or "knocking" of the pipe. The gap in the split ring is so located as to enable the hanger to provide a maximum of uninterrupted insulation between the pipe and joist. The hanger is also provided with means for facilitating insertion of the pipe into the bore, and is so constructed that the hanger is not subjected to a stress or strain sufficient to cause a "set" or permanent distortion of the hanger in the course of inserting the pipe into the bore.

5 Claims, 12 Drawing Figures

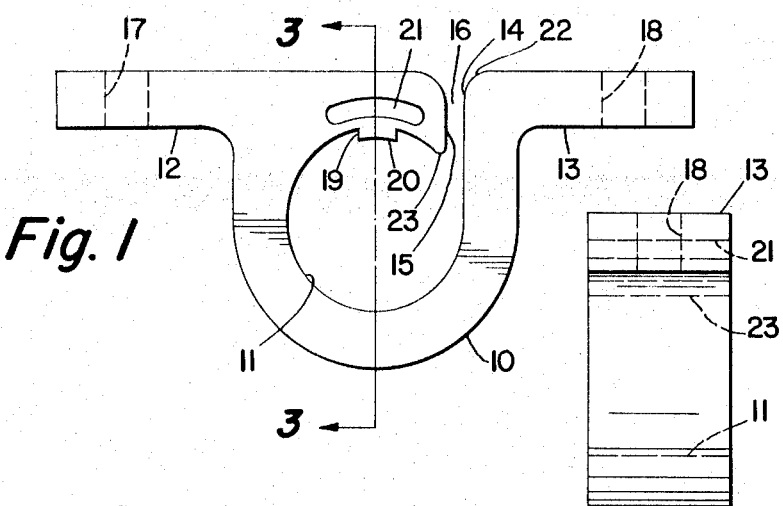
Fig. 1
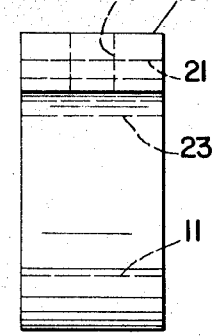
Fig. 2
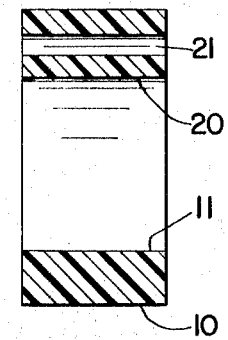
Fig. 3
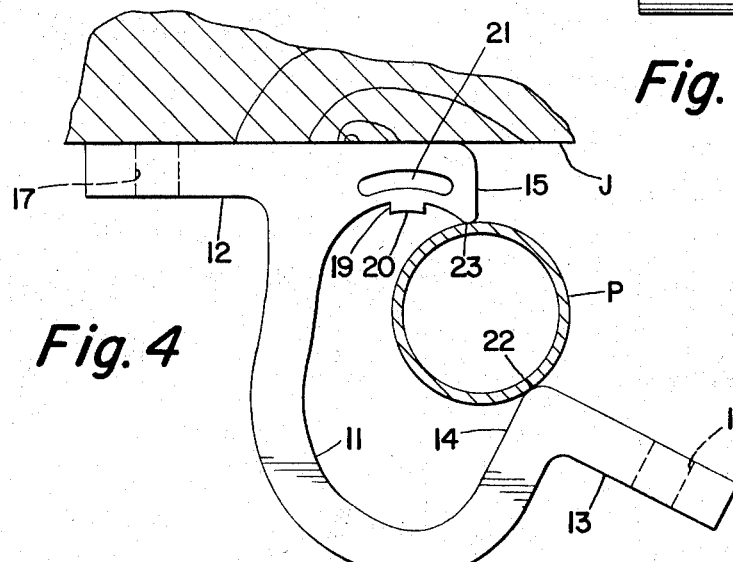
Fig. 4
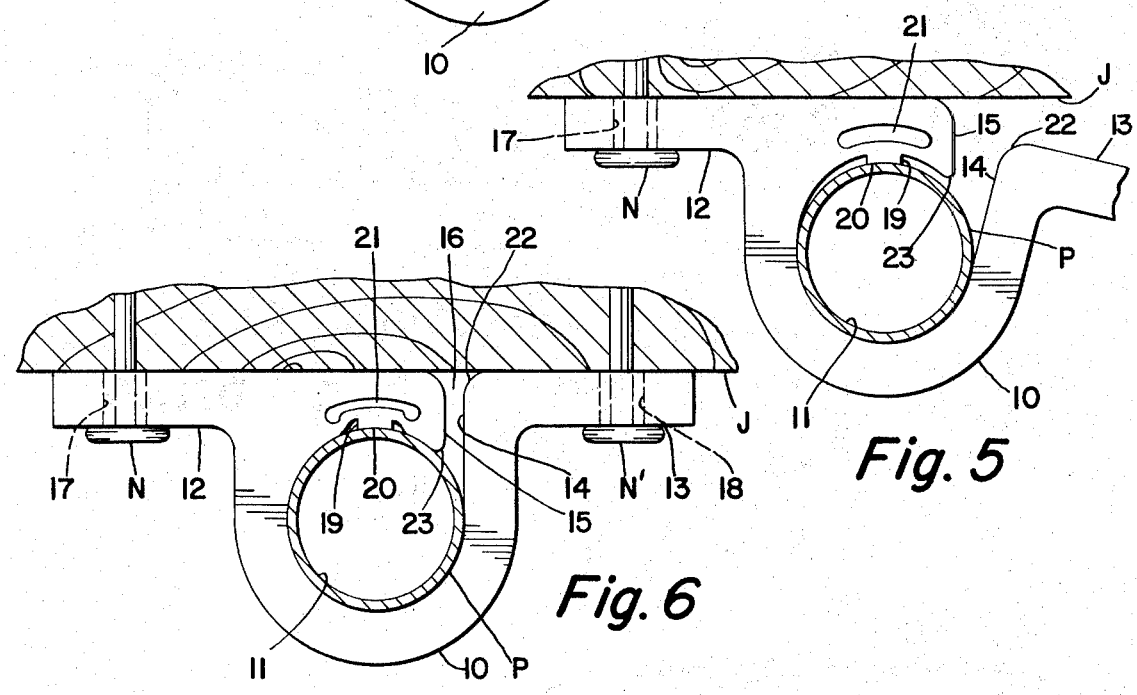
Fig. 5
Fig. 6

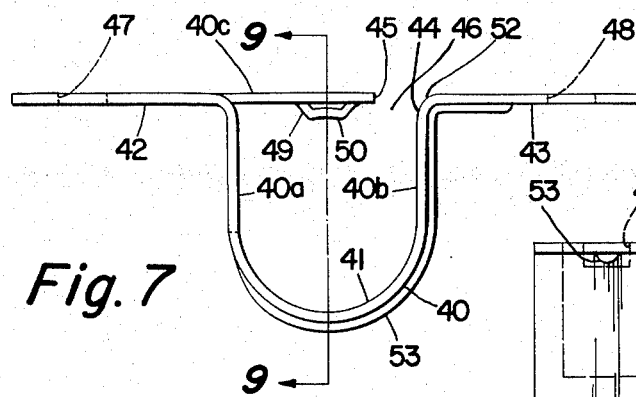
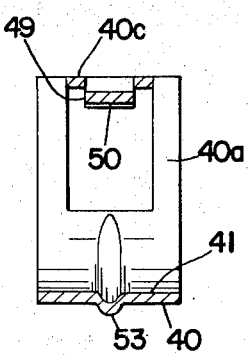
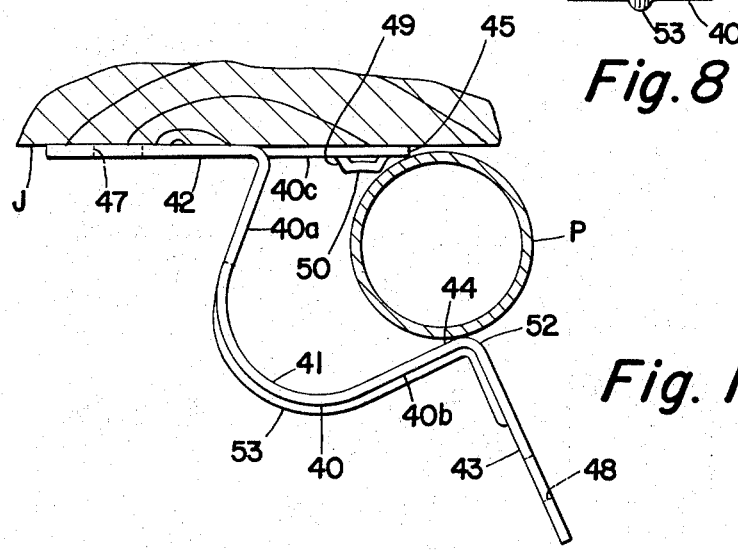
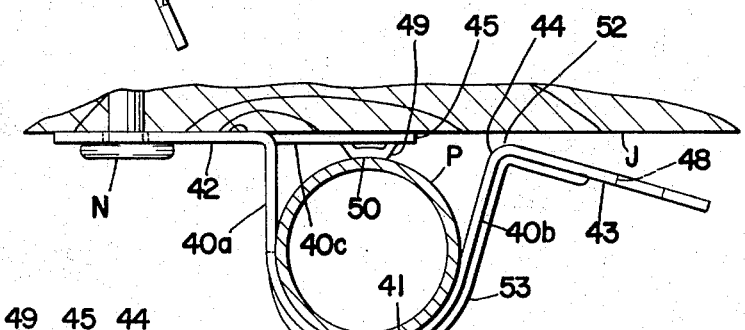
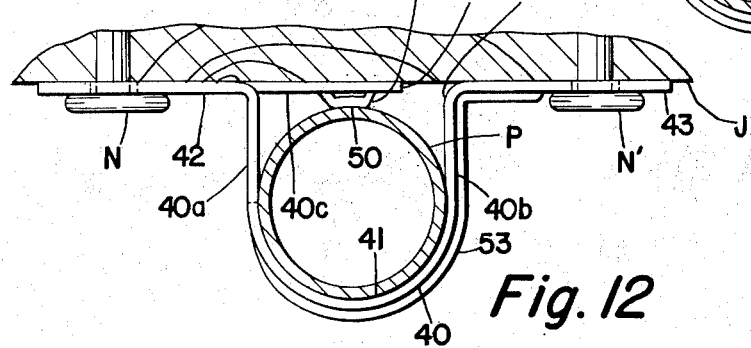

PIPE HANGERS

This invention relates as indicated, to pipe hangers, but is directed more particularly to a hanger of the type disclosed, for example, in the Walten et al, U.S. Pat. No. 3,266,761.

In Walton et al, U.S. Pat. No. 3,266,761, a pipe hanger is disclosed comprising a cured elastomeric plastic resin body having an axial bore and an opening extending from the inside of the bore to the exterior of the body to provide a deformable split ring adapted to surround the pipe to be supported.

The hanger has integrally formed attaching ears extending laterally from each side of the body and in alignment with the opening to facilitate spreading the opening for application to the pipe and to secure the pipe hanger to a flat surface with the opposed faces of the opening brought together at the opening in abutment with each other to limit the size of the bore around the pipe.

Such a hanger has certain disadvantages, among which are the following:

a. Since the opposed faces of the opening or slit are in abutment with each other, the hanger has a slip fit around the pipe, and there can be no tension applied by the hanger to the pipe, to increase the grip of the hanger on the pipe. This necessitates that the axial bore in the Walton hanger have precisely the same diameter as the outside diameter of the pipe to be supported.

b. The opening or slit in the hanger of the Walton patent is located at a point where the space between the pipe and the joist to which the hanger is secured is at a minimum, and there is therefore a minimum of insulation between the pipe and joist at this point.

c. As indicated in FIG. 4 of the Walton patent, application of the hanger to the pipe to be supported requires that the spreading of the hanger be such that the diameter of the axial bore of the hanger is virtually twice the outside diameter of the pipe. This not only creates a strain or stress on the hanger which, if it did not break or crack the hanger, could create a "set" in the hanger which would make it difficult to properly fit the hanger about the pipe.

The present invention has, as its primary object, the provision of a hanger of the character described, which overcomes all of the disadvantages of the aforesaid hanger.

Another object of the invention is to provide a hanger of the character described, wherein provision is made for permitting a desired degree of tension to be applied to the pipe, while eliminating the necessity of having the axial bore in the hanger of precisely the same diameter as the outside diameter of the pipe.

A further object of the invention is to provide a hanger of the character described, in which the opening or slit is located at a point of the hanger such that a maximum of insulation is provided between the pipe and the joist.

A further object of the invention is to provide a hanger of the character described, in which spreading of the hanger for the purpose of applying it to the pipe is kept at a minimum, so as to avoid creation of undesirable stresses or strains on the hanger and the creation of any "set" in the hanger.

A further object of the invention is to provide a hanger of the character described, wherein means are provided for eliminating vibration or "knocking" of the pipe supported or clamped by the hanger.

A still further object of the invention is to provide a modification of the hanger, which is made of metal or metallic strip, and which embodies most, if not all, of the features and advantages of the preferred form of the invention.

Other objects and advantages of my invention will be apparent during the course of the following description.

In the accompanying drawings forming a part of this specification, and in which like numerals are employed to designate like parts throughout the same, FIG. 1 is an end elevational view of one form of the hanger in its normal or relaxed or undistorted condition;

FIG. 2 is a side elevational view of the hanger, as viewed from the right side of FIG. 1;

FIG. 3 is a cross-sectional view, taken on the line 3—3 of FIG. 1;

FIG. 4 is a view similar to FIG. 1, but showing the first step in applying the hanger to a pipe which is to be supported by the hanger;

FIG. 5 is a view similar to FIG. 4, but showing a second or intermediate step in the application of the hanger to the pipe;

FIG. 6 is a view similar to FIG. 5, but showing the final step in the application of the hanger to the pipe;

FIG. 7 is a view similar to FIG. 1, but showing a modification in which the hanger is made of a metallic material, such for example, as steel;

FIG. 8 is a side elevational view of the hanger of FIG. 7, as viewed from the right side of FIG. 7;

FIG. 9 is a cross-sectional view, taken on the line 9—9 of FIG. 7;

FIG. 10 is a view showing the first step in applying the hanger of FIG. 7 to a pipe which is to be supported by the hanger;

FIG 11 is a view showing a second or intermediate step in the application of the hanger of FIG. 7 to the pipe, and FIG. 12 is a view showing the final step in the application of the hanger of FIG. 7 to the pipe.

Referring more particularly to FIGS. 1 to 6 inclusive of the drawings, and especially to FIGS. 1, 2 and 3, a pipe hanger is shown which is preferably molded or shaped from a cured elastomeric plastic resin, such, for example, as polypropylene or polyethylene.

The hanger comprises a body 10 having an axial bore 11 therein, and attaching ears 12 and 13 formed integrally with the body and extending tangentially to said bore in opposite directions. The pipe to be supported, and to which reference will presently be made, extends through the bore 11.

The body 10 is in substantially the form of a split ring, which is split along a plane substantially tangential to one side of the bore 11 and perpendicular to the plane of the ears 12 and 13. This split is defined by a wall or surface 14, which is tangential to the bore 11, and by a wall or surface 15, parallel with the wall or surface 14, and spaced therefrom to provide a space or gap 16. The ears 12 and 13 lie in a common plane which intersects the space or gap 16.

The ears 12 and 13 are provided respectively with holes or apertures 17 and 18, which serve a purpose to be presently described.

The wall of the bore 11 is continuous with the exception of two points at which this continuity is interrupted. One of these points is the space or gap 16, to which reference has already been made. At the other of these points, a rib or pad 19 is provided, which is formed integrally with the hanger and extends radially-inwardly into the bore 11. The rib or pad 19 extends the full length of the bore, and has at its inner end an arcuate face 20, against which the pipe to be supported is adapted to bear. The rib 19, it may be noted, is disposed perpendicularly to the plane of the ears 12 and 13 and at that side of the hanger at which the ears 12 and 13 are located.

The curvature of the face 20 corresponds substantially with the curvature of the outer surface of the pipe which is to be supported by the hanger, so that the diameter of the bore 11 is slightly greater than the outside diameter of such pipe.

The portion of the body or split ring 10 which is disposed radially-outwardly of the rib 19 is provided with a slot 21, which extends the full length of the hanger, and is of arcuate cross-section. The slot 21, moreover, is concentric with the bore 11 and slightly eccentric with respect to the face 20 of the rib 19.

It may be further noted that the wall or surface 14 terminates in a curved or rounded surface 22, and that the wall or surface 15 terminates in a curved or rounded surface 23. The function of these surfaces 22 and 23 will be presently explained.

In applying the hanger to the pipe P which is to be supported, the hanger is spread apart in the manner shown in FIG. 4, and that portion of the hanger which has the rib 19 and slot 21 is slipped between the floor joist J and the pipe P, as also shown in FIG. 4. This entry is facilitated through the provision of the curved or rounded surfaces 22 and 23, to which reference has previously been made.

The pipe P is then pushed completely into the bore 11 of the hanger, as shown in FIG. 5, after which a nail N is driven through the hole 17 and into the joist J, as also shown in FIG. 5, so as to flatly secure the ear 12 and a portion of the body 10 of the hanger to the joist.

At this point, the ear 13 of the hanger has not been secured to the joist, but occupies a position approximately that indicated in FIG. 5.

A nail N' is then driven through the hole 18 of the ear 13 and into the joist J, as shown in FIG. 6, in which the hanger is seen in its final position, firmly securing the pipe P in place.

In the course of thus driving the nail N' in place, pressure is brought to bear by the body 10 of the hanger against the pipe P, this pressure being then communicated by the pipe to the face 20 of the rib 19, causing the rib to be pushed radially outwardly out of the bore 11, and the portion of the body 10 which lies between the rib 19 and slot 21 to be distorted outwardly in the manner shown in FIG. 6.

This distortion creates frictional pressure of the rib 19 against the pipe, and this, combined with the frictional pressure of the wall of the bore 11 on the pipe, due to the provision of the space or gap 16, prevents vibration or "knocking" of the pipe, as frequently experienced in water-carrying pipes.

Due to the maintenance, at all times, of the gap 16, a desired tension is always applied by the hanger to the pipe, thereby increasing the grip of the hanger on the pipe, while eliminating the necessity of having the axial bore in the hanger of precisely the same diameter as the outside diameter of the clamped pipe.

The location of the gap 16 at a position substantially offset or spaced from a vertical plane passing through the axis of the bore in the hanger enables the hanger to provide a maximum of uninterrupted insulation between the pipe and joist. This insulative effect of the hanger is further enhanced by the provision of the slot 21, which forms an air space between the pipe and joist.

As apparent from FIG. 4, the spreading of the hanger for the purpose of applying it to the pipe, or applying the pipe to the hanger, is at a minimum, and substantially less than required in the aforesaid Walton patent, so that undesirable stresses and strains on the hanger are avoided, as well as the creation of any "set" or permanent distortion in the hanger.

It is thus seen that a hanger has been provided which overcomes all of the disadvantages of prior hangers of this type, and which, at the same time, has incorporated therein additional advantageous features which increase the effectiveness and utility of the hanger.

Referring more particularly to FIGS. 7 to 12 inclusive of the drawings, and especially to FIGS. 7, 8 and 9, a modification is shown, in which the hanger is made of a metallic material, such, for example, as steel.

The hanger comprises a body of channel-like form consisting fo a lower portion 40 of semi-circular shape, spaced parallel arms 40a and 40b, which extend vertically upward from the ends of the portion 40, and a tongue or finger 40c, which is stamped from the material of the arm 40a and bent to the horizontal position shown in FIG. 1, wherein it overlies the portion 40, and provides, with the portion 40, and arms 40a and 40b, what is, in effect, an axial bore 41.

The hanger further comprises attaching ears 42 and 43 formed integrally with the body and extending substantially tangentially to the bore 41 in opposite directions. The pipe to be supported, and to which reference will presently be made, extends through the bore 41.

The body 40 is in substantially the form of a split ring, which is split along a plane substantially tangential to one side of the bore 41 and perpendicular to the plane of the ears 42 and 43. This split is defined by a wall or surface 44, which is tangential to the bore 41, and by a wall or surface 45, parallel with the wall or surface 44, and spaced therefrom to provide a space or gap 46. The ears 42 and 43 lie in a common plane which intersects the space or gap 46.

The ears 42 and 43 are provided respectively with holes 47 and 48, which serve a purpose to be presently described.

The wall of the bore 41 is substantially continuous with the exception of two points at which this continuity is interrupted. One of these points is the space or gap 46, to which reference has already been made. At the other of these points, the metal of the tongues or finger 40c is sheared and stamped to provide a resilient or flexible element 49, which extends radially-inwardly into the bore 41, and has, at its inner end, an arcuate face 50 against which the pipe to be supported is adapted to bear. The element 49, it may be noted, is disposed substantially perpendicularly to the plane of the ears 42 and 43 and at that side of the hanger at which the ears 42 and 43 are located.

The curvature of the face 50 corresponds substantially with the curvature of the pipe which is to be supported by the hanger, so that the diameter of the bore 41 is slightly greater than the outside diameter of such pipe.

The wall or surface 44 terminates in a curved or rounded surface 52, the function of which will be presently described.

For the purpose of reinforcing certain pairs of the hanger, a reinforcing rib 53 is stamped outwardly from those portions of the hanger constituting the body portion 40, arm 40b, and ear 43.

In applying the hanger to the pipe P which is to be supported, the hanger is spread apart in the manner shown in FIG. 10, and that portion of the hanger constituting the tongue 40c and element 49 is slipped between the floor joist J and the pipe P, as also shown in FIG. 10. This entry is facilitated through the provision of the curved or rounded surface 52 to which reference has previously been made.

The pipe P is then pushed completely into the bore 41 of the hanger, as shown in FIG. 5, after which a nail N is driven through the hole 47 and into the joist J, so as to flatly secure the ear 42 and tongue 40c of the hanger to the joist.

At this point, the ear 43 of the hanger has not been secured to the joist, but occupies a position approximately that indicated in FIG. 11.

A nail N' is then driven through the hole 48 of the ear 43 and into the joist J, as shown in FIG. 12, in which the hanger is seen in its final position, firmly securing the pipe P in place.

In the course of thus driving the nail N in place, pressure is brought to bear by the body portion 40 of the hanger against the pipe P, this pressure being then communicated by the pipe to the face 50 of the element 49, causing the element 49 to be biased or bent slightly radially outwardly in relation to the bore 41. This creates frictional pressure of the element 49 against the pipe, and this, combined with the frictional pressure of the wall of the bore 41 on the pipe, due to the provision of the space or gap 46, prevents vibration or "knocking" of the pipe, as frequently experienced in water-carrying pipes.

Due to the maintenance, at all times, of the gap 46, a desired tension is always applied by the hanger to the pipe. thereby increasing the grip of the hanger on the pipe, while eliminating the necessity of having the axial bore in the hanger of precisely the same diameter as the outside diameter of the clamped pipe.

The location of the gap 46 at a position substantially offset from a vertical plane passing through the axis of the bore 41 in the hanger enables the hanger to provide a maximum of uninterrupted insulation between the pipe and the joist.

As apparent from FIG. 10, the spreading of the hanger for the purpose of applying it to the pipe, or applying the pipe to the hanger, is at a minimum, and substantially less than required in the aforesaid Walton patent, so that undesirable stresses and strains on the hanger are avoided, as well as the creation of any "set" or permanent distortion in the hanger.

Although the invention has been described as a "pipe" hanger, it is to be understood that the term "pipe," as herein used, is to be construed to cover conduits and rods.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. A one piece pipe hanger comprising a generally U-shaped body portion, a pair of attaching ears formed integrally with said body portion, each ear of said pair extending in an opposite direction in the same plane away from said U-shaped body portion, a tongue having a free end extending in an opposite direction from one of said ears across a substantial portion of the opening extending between the legs of said U-shaped body portion, resilient rib means integrally formed on said tongue and spaced from said free end extending radially inwardly therefrom substantially perpendicular to the plane of the ears and dimensioned to engage the wall of a pipe carried by said hanger and urge said pipe toward the bight portion of said U-shaped body.

2. A hanger, as defined in claim 1, wherein said rib has, at its radially-inward end, an arcuate surface, the curvature of which corresponds substantially to the curvature of the outer surface of said pipe.

3. A hanger, as defined in claim 1, wherein the portion of the tongue which is disposed radially outwardly of said rib is provided with a slot extending the full length of said hanger and of arcuate cross-section, said slot being concentric with said U-shaped body portion of said body.

4. A pipe hanger of the character described, formed in one piece, of a metallic material, said hanger comprising a body of channel-like form consisting of a lower portion of semi-circular shape, spaced parallel arms extending vertically upward from the ends of said lower portion, and a tongue including a free end stamped from the material of one of said arms and bent to a horizontal position wherein it overlies said lower portion, said hanger further comprising attaching ears formed integrally with said body and lying in a plane substantially coplanar with said tongue, and means for exerting frictional pressure on said pipe when said body is clamped to said pipe, whereby to prevent vibration of said pipe, said means comprising a rib stamped from the metal of said tongue spaced from the free end thereof and extending toward said lower portion of said body and terminating in an arcuate surface.

5. A hanger, as defined in claim 4, wherein said rib is located in said tongue at a point which is substantially perpendicular to the plane in which said ears lie.

* * * * *